(No Model.)
M. J. BOBO.
VEHICLE BRAKE.
No. 493,676. Patented Mar. 21, 1893.
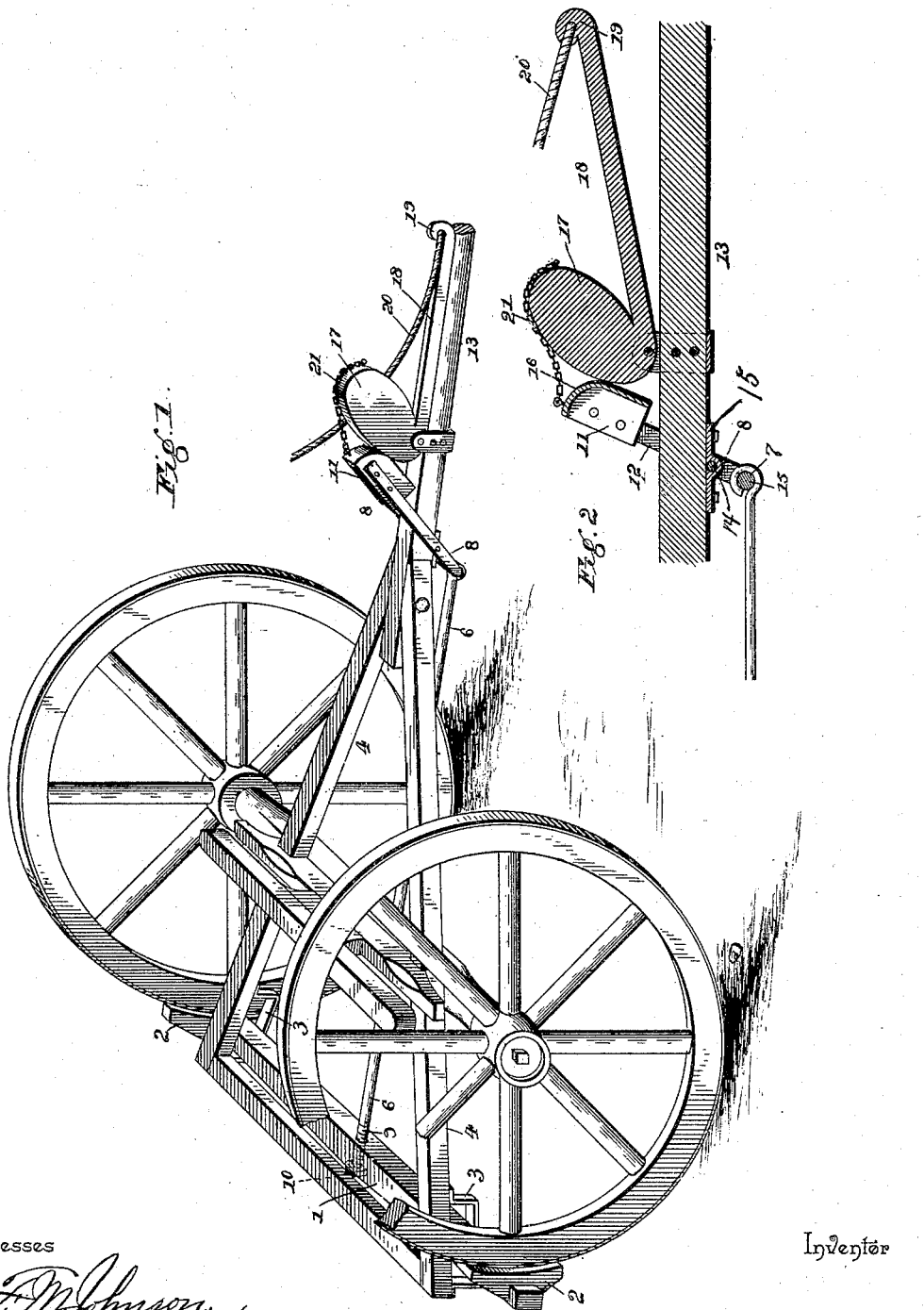
Witnesses
F. M. Johnson
N. J. Riley
Inventor
Martin J. Bobo
By his Attorneys,
C. A. Snow & Co.

UNITED STATES PATENT OFFICE.

MARTIN J. BOBO, OF ROCKMART, GEORGIA.

VEHICLE-BRAKE.

SPECIFICATION forming part of Letters Patent No. 493,676, dated March 21, 1893.

Application filed September 21, 1892. Serial No. 446,405. (No model.)

*To all whom it may concern:*

Be it known that I, MARTIN J. BOBO, a citizen of the United States, residing at Rockmart, in the county of Polk and State of Georgia, have invented a new and useful Vehicle-Brake, of which the following is a specification.

The invention relates to improvements in vehicle brakes.

The object of the present invention is to simplify and improve the construction of that class of vehicle brakes which operate on the fore wheels, and to enable the same to be readily adjusted to suit a vehicle and to be quickly applied.

The invention consists in the construction and novel combination and arrangement of parts hereinafter fully described, illustrated in the accompanying drawings and pointed out in the claims hereto appended.

In the drawings—Figure 1 is a perspective view of a portion of a running gear provided with a brake constructed in accordance with this invention. Fig. 2 is a detail sectional view.

Like numerals of reference indicate corresponding parts in all the figures of the drawings.

1 designates a brake-bar carrying brake-shoes 2 at its ends and suspended in guides 3 beneath the front hounds 4 in rear of the fore-wheels in guides 3, whereby a forward movement of the brake-bar will apply the brake shoes to the fore wheels. The brake-bar 1 is adjustably connected to the rear end of a connecting rod 6 which has its front end provided with an eye 7 and attached to the lower end of a short brake-lever 8. The rear end 9 of the connecting rod is threaded and is provided with a nut 10, whereby the brake-bar is adjusted and the rear end of the connecting rod passes through an opening in the brake-bar. The short brake-lever 8 is constructed of metal and it consists of a cap 11 and a yoke 12 receiving the tongue 13 on which it is fulcrumed by a transverse pin 14 arranged in bearings of a plate 15. The lower end or bend of the yoke 12 is rounded and forms a cross-piece 15 which is received by the eye 7 of the connecting rod 6. The cap 11 of the lever 8 is a shell and is rounded to form a curved face 16 and is engaged by a cam head 17 of an operating lever 18, which is fulcrumed at the base of its head on the tongue in advance of the brake-lever 8. The front end 19 of the operating lever is connected with a rope 20, and when the said end 19 of the operating lever is raised and moved rearward, the cam head 17 engages the curved face 16 of the lever 8 moving the same rearward and applying the brake. The upper end of the lever 8 which is inclined is connected by a chain 21 with the cam head of the operating lever, whereby when the operating lever falls back upon the tongue after an application of the brake, the brake-lever will be drawn forward to relieve the fore wheels of the brake shoes.

It will be seen that the brake mechanism is simple and comparatively inexpensive in construction, that it may be readily mounted on the running gear of a vehicle, and that by it the brake-shoes may be applied with great force.

What I claim is—

1. The combination with a running gear, of a brake-bar carrying brake-shoes, a short brake-lever fulcrumed on the tongue and having its lower end connected with the brake-bar, and a cam lever fulcrumed on the tongue in advance of the brake-lever and having its head engaging the upper end of the brake-lever, substantially as described.

2. The combination with a running gear, of a brake bar carrying brake-shoes, a short brake-lever fulcrumed on the tongue and having its upper end rounded and having its lower end connected with the brake-bar, and the cam lever fulcrumed on the tongue in advance of the brake-lever and having a cam head at its rear end engaging the rounded portion of the brake-lever and connected with the latter, substantially as described.

3. The combination with a running gear, of a brake bar arranged in rear of the fore wheels and carrying brake-shoes, a brake-lever fulcrumed on the tongue and consisting of a yoke receiving the tongue and provided at its lower end with a rounded cross-piece, and a cap secured to the sides of the yoke and having a curved face, a connecting rod provided at its front end with an eye receiving the cross-piece and having its rear end adjustably secured to the brake-bar and a cam lever fulcrumed on the tongue in advance of the brake-lever and provided at its front end with a flexible connection and having at its rear end a cam head engaging the brake lever, substantially as described.

4. The combination with a running gear, of a brake bar arranged in rear of the fore wheels and carrying brake-shoes, a brake-lever fulcrumed on the tongue and consisting of a yoke, and a cap having a curved face, a connecting rod provided at its front end with an eye receiving the yoke and having its rear end secured to the brake-bar, a cam lever fulcrumed on the tongue in advance of the brake-lever and having at its rear end a cam head engaging the brake-lever, and a chain connecting the brake-lever with the cam head of the operating lever, substantially as described.

In testimony that I claim the foregoing as my own I have hereto affixed my signature in the presence of two witnesses.

MARTIN J. BOBO.

Witnesses:
JOHN H. SIGGERS,
H. T. RILEY.